Jan. 8, 1929.  L. P. HYNES  1,698,596
ELECTRIC WATER HEATING
Filed July 27, 1927
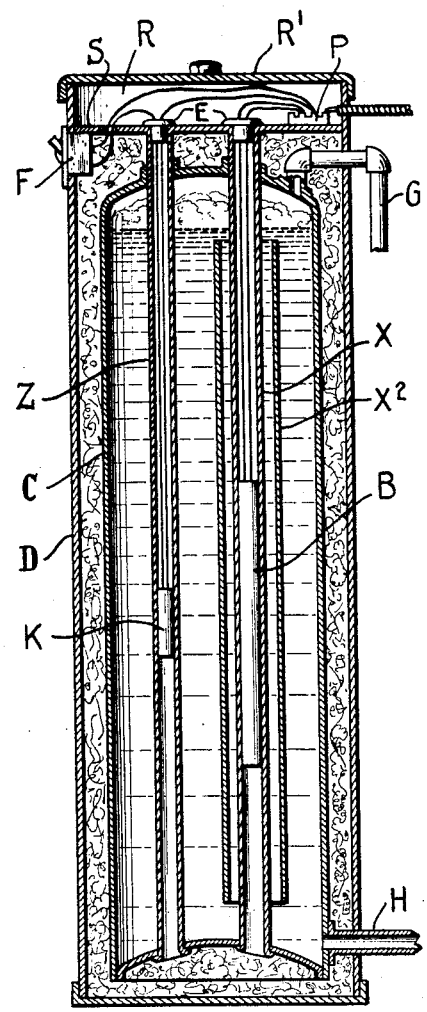
INVENTOR
LEE P. HYNES
BY
E. M. Bentley
ATTORNEY Patented Jan. 8, 1929.

1,698,596

UNITED STATES PATENT OFFICE.

LEE P. HYNES, OF ALBANY, NEW YORK, ASSIGNOR TO HYNES & COX ELECTRIC CORPORATION, OF ALBANY, NEW YORK, A CORPORATION OF NEW YORK.

ELECTRIC WATER HEATING.

Application filed July 27, 1927. Serial No. 208,742.

For a detailed description of the present form of my invention, reference may be had to the following specification and to the accompanying drawing forming a part thereof.

My invention relates to the heating of water by electric means and the storing thereof for subsequent service. It involves both a method and an apparatus for performing the method. It is particularly designed for domestic use but may be employed in other situations where similar appropriate conditions exist.

It has heretofore been proposed to provide for the electric heating of water while a stream thereof is being drawn off through a faucet, without attempting to create a supply of previously-heated water from which a stream may be drawn off at will. In such a system of heating, as used, an electric heater is required of a size adequate to raise the temperature of the water from its cold condition to the maximum temperature desired within the short period in which it is being drawn. That requires a large heater and a heavy though temporary draught on the electric current supply. It is objectionable to heat water by such an intense method since it tends to disintegrate the heating surfaces and to impair the water by incipient decomposition which gives it a corrosive quality. The chief objection, however, is that it requires that an ample supply of electric current should be always available, since water may be drawn off at any moment, whereas it is my purpose to provide that the use of the heating current should occur only at night or at other "off-peak" hours when the electrical supply companies can afford to sell current at a reduced rate. Without such low rate electrically-heated water is too costly for general use. In the meanwhile an adequate supply of previously-heated water is kept in storage for use at will.

In my method I make use of a tank wherein the heated water can be kept for long periods of time without material loss of heat, and I provide for heating-periods which occur at intervals that are automatically determined—not by each individual draught— but by total draught of an amount predetermined for each individual installation. These intervals may include a considerable time—for example—12 hours or more. By this means I can use a given standard tank and heater for a wide range of hot-water demands, and can adjust each installation according to its expected total draught for a given period. Thereby I bring the heating-up periods at any desired off-peak hour. At the same time in the hours between succeeding heating-up periods there is constantly available hot water at the maximum temperature for which the installation is set. Thus, if the heating-up periods are, for example, 12 hours apart, the water drawn off at the tenth hour will be just as hot as that drawn off at the first or second hour, and there will, moreover, be no limit on the amount of water available at the same temperature at any one draught so long as the total of the several draughts is within the total for which the tank has been set. This does not, however, prevent the existence of other heating-up periods in the emergency of an over-draught. Thus, while substantially all of the heating-up occurs in non-peak hours, it is not necessary to wait for such an hour, in the event of an overdraught, before hot water is available. In this manner I provide the ideal form of hot-water supply at the minimum expenditure of electrical energy and at the minimum rate per kilowatt-hour charged by the electric company for off-peak or under-load hour service.

First I apply the electric heat to the water along one or more vertical isolated water columns within the total body of water in the tank. Each isolated column is also caused to flow repeatedly along the line of an electric heater in a direction from bottom to the top of the tank. By this means I am able to heat a large amount of water by a heater-element which is at a comparatively low temperature. This is an important matter, since it reduces corrosion materially, and corrosion is perhaps the most difficult foe that electric water-heating has to contend with. Moreover, I am thereby enabled to adjust the thermostat, which serves to turn the electric heat on or off, at any desired level, as I will explain hereinafter, because at whatever level it may be, it will be, for its cutting-off function, subject to approximately the same water temperature. Otherwise, if all the water in the tank were not at nearly the same temperature, the thermostat would cut-off the heating current when set high up in the tank earlier than it would when set low down. It would not cut off at a temperature representative of the whole body of water, but at a temperature representing only the one layer or stratum where it might be set.

Secondly; in connection with my system described above, I provide for setting the thermostat at a point higher up or lower down in the tank according to the amount of total draught between heating-up periods which it is desired to have, or, conversely stated, according to the time period which it is desired to have between said heating-up periods in order to make them occur at off-peak times in the loading of the electrical supply stations. For example, in a specific case, when the bottom of the thermostat was set 30 inches below the top of the tank, it would start the reheating after five gallons of hot water had been drawn off, but when set 10 inches from the top it would not start the reheating until after 18 gallons had been drawn off. So, if in the given time—say 12 hours—one household used 5 gallons of hot water, its thermostat would be set 30 inches down; but for a household that used 18 gallons in the specified time, its thermostat would be set 10 inches down. Thus, by adjusting the position of the thermostat in any particular tank with respect to the heating duty required of it within the predetermined period, I can make that particular tank perform its particular assigned heating-up duty at any desired time of day without resort to a clock-switch or any such other artifice as is ordinarily employed for fixing a timed operation.

As regards the tank construction I provide both an internal and external casing and the space between the two I fill in with mineral wood or other heat-insulating material. These casings are in the form of long cylinders seated on end. Inside of the inner casing I place one or more vertical sealed tubes open to the atmosphere at their upper ends and preferably closed at their lower ends. These tubes are sealed by brazing them to the tank-heads and they become a part of the water-tight tank wall. They receive the tank pressure externally and atmospheric pressure internally. At their upper ends these sealed tubes are also extended through the wall of the outer casing, being thereby accessible at their upper ends from outside of both casings. I also provide above the outer casing a service space or compartment having a removable cover, and into this space the aforesaid open-ended tubes enter. The inner casing is also provided with a pipe at its lower end through which cold water is free to enter under pressure and another pipe at its upper end through which the hot water can be drawn off at will. Finally, I place within the inner casing, and around each of the aforesaid tubes which are to contain heaters, an external sleeve open at both top and bottom and of an inside diameter somewhat larger than the outside diameter of the tube which it surrounds The function of these sleeves will be described hereinafter. This completes the tank itself apart from any heating means. In this condition it may be transported, connected up and filled with water, and may even be used indefinitely as a cold-water tank. The electrical heating devices are also made up separately and separately applied to the aforesaid tank independently of its water contents. The heater elements are preferably of the metal-clad type and of cylindrical form. When the cover of the aforesaid service-space is removed, a heater element can be inserted in the open end of one of the aforesaid sealed tubes and, being provided with flexible lead wires, can be lowered down in the sealed tube as far as desired and there held by a stop-button on the flexible lead wires. In ordiary practice two sealed tubes are thus equipped with heater-elements. The controlling thermostat is, in like manner, dropped into another open-ended sealed tube and, by means of its flexible lead wires and stop-button, it can be fixed at any desired level within its sealed tube. Any desired system of electric circuits may be employed to enable the thermostat to connect the heater elements to the supply line when the temperature drops to a predetermined degree and to disconnect them when the temperature rises to a higher predetermined degree. Such circuit arrangements are well known, but I prefer the one which I have shown in my aforesaid application for United States Patent Serial Number 110,480, filed May 20, 1926.

Referring to the drawing, the outer metal casing is shown at D and the inner one at C. The space between the two casings is shown as filled in with heat-insulating material, such as mineral wool. At X is shown one of the aforesaid sealed tubes. It is brazed to the top and bottom heads of the inner casing C. It also passes through the top plate S of the outer casing and opens into the service space or compartment R which has a removable cover $R^1$. Thus the inside of sealed tube X is at atmospheric pressure, while its outside is subjected to the tank pressure. A cylindrical metal-clad heater element is shown at B. It fits easily within sealed tube X and is introduced therein through its open top end within service space R by lifting cover $R^1$. It is suspended within tube X by its flexible lead-wires which pass through a stop-button E that determines the level at which element B will hang. In like manner I insert in a separate sealed tube Z the thermostat K. The thermostat is also suspended by its lead-wires and the level at which it will hang is adjusted in like manner by a stop-button E. Outside of the sealed tube X is fixed a sleeve $X^2$ which is open at both top and bottom and its internal diameter is somewhat larger than the external diameter of sealed tube X. A sleeve $X^2$ is placed around each sealed tube that contains a heater element but not around tube Z that contains the thermostat K. The casing C is provided at its lower end with a pipe F for admitting cold water under pressure and at its upper end with a pipe G through which hot water may be drawn off. In service-space R is a suitable connection block P for the electric wiring and on outer casing D is a control-switch F.

The operation of the above described apparatus is different at different times and may be described for each of three different conditions, to wit, (a) the heating-up period, (b) the storage period, (c) the control.

It will be assumed, for the heating-up, that the thermostat has acted to close the electric circuit to the heater element, because the temperature of the water, at the particular level occupied by the thermostat, has dropped to— say 141 degrees. Then the heater B will begin to act on the isolated vertical column of water between sealed tube X and its sleeve X². The water in that column will begin to flow upward at a rate dependent on the cross-area of the column and the input of electric energy in the heater. Moreover, this flow follows along the axial length of the heater. By this means there is an accumulation of heat in the water as it progresses upward. I can, therefore, keep the temperature of the heater at a comparatively low point, because the accumulation by small increments of heat amounts to a large total by the time a given unit volume of water has passed upward over the length of tube X corresponding to the length of the heater element inside of it. It will be assumed that during this heating-up period there is no water drawn off and hence no cold water coming in. Only the temperature of water that is already in the tank is being raised. A column of this water is withdrawn from the mass at the bottom of sleeve X² and kept isolated therefrom until it is delivered into said mass again at the top of the sleeve. This isolated progress of the isolated water up along the heater will raise the temperature of the given volume of water a definite number of degrees,—say 10 degrees, from 140 to 150— then before long the entire mass has been heated from the top downward 10 degrees, so that the water in succeeding excursions now enters the bottom of sleeve X² at 150 degrees instead of 140. This being repeated the entire body of water outside of the isolated column is always of practically the same temperature throughout. Consequently when this uniform temperature reaches the point at which the thermostat is to act and cut off heat, it makes no difference whether the thermostat has been set high up or low down in the tank for the purpose of the time adjustment heretofore described. Otherwise a thermostat adjusted high might act too soon and one adjusted too low might act too late. It might even happen that the water would be boiling at the top of the tank but at a low-down thermostat it would be too cold to cause the thermostat to act and cut-off the heater.

During the next, or storage period, no heat is being added but, on the contrary, heat is being lost, first by slow dissipation and, secondly, by inflow of cold water to take the place of hot water that may be, from time to time, drawn out at the top. By virtue of the heat insulation the dissipation loss is very small—say one degree per hour—and is practically negligible. But the loss by incoming cold water is greater and is the loss, which will eventually, according to the setting of the thermostat-level as heretofore explained, cause the thermostat to cut in the electric heater for the next reheating.

The control period is really another phase of the storage period. The incoming cold water does not rise up in vertical columns like the hot water because it begins to enter during the storage period when the heater is cut off. The starting of the heater is on a different principle from its stopping.

The cold water enters first in a horizontal stratum reaching across the entire cross-sectional area of the tank. There is a well defined line of division between this stratum of cold water and the warmer water above it. This line or plane of separation is maintained during the storage period but gradually rises as the hot water is drawn off and cold water enters to replace it. When it finally reaches the thermostat, the thermostat acts to cut in the heaters. If the thermostat is set high up in the tank the said line or plane of separation will not reach it until a larger amount of cold water has flowed in, corresponding to a larger amount of hot water drawn off. In the example cited above when the thermostat bottom was only 10 inches from the top of the tank it took an inflow of 18 gallons of cold water to make it act, whereas at 30 inches it took only five gallons. In effect I measure the time I wish to have elapse between one reheating period and the next in terms of the volume or gallons of hot water that will be consumed in the meanwhile. Then I set the thermostat at such a level that the corresponding volume of cold water will take the said time which I wish to elapse, to reach the thermostat. This change of level does not affect the termination of the heating because, during the heating, the body of water is maintained at a uniform temperature throughout, so that a thermostat will act at the same maximum water temperature whether it is high up or low down in the tank. This also insures that the storage interval will start with the whole body of water at the maximum temperature. This materially prolongs the interval before another heating period is required.

By thus continuing the heating until the whole body of water is heated (which is insured by the described vertical-column system that makes the temperature at which the thermostat acts representative of the whole body instead of some local point therein) I provide an amount of hot water which, by reason of the heat insulation, will be adequate for a long period of service without further reheating. Then I start the reheating, not according to the mass temperature, but according to the local temperature at the line of demarcation between hot and cold portions, and I time the reheating by setting the thermostat at a selected level.

What I claim as new and desire to secure by Letters Patent is:

1. A storage tank for electrically heated water comprising a heat-insulated casing, a vertical tube therein but open at its upper end outside of the said casing, an electric heater removably mounted in said tube, an electric supply conductor for said heater extending into the upper end of said tube, a second vertical tube sealed into the casing and also open at its outer end outside of the casing, a controlling thermostat removably mounted in said second tube, and an electric supply conductor for said thermostat extended through the open end of the tube.

2. A storage tank for electrically heated water comprising inside and outside casings, an intermediate heat-insulating material, a vertical heater tube sealed in the inner casing but having its upper end open outside of both casings, a vertical thermostat tube also sealed in the inner casing but having its upper end open outside of both casings and circuit pipes passing through both inside and outside casings at the top and bottom of said tank respectively.

3. An electrically heated storage tank combined with a hot-water supply system and comprising an upright heat-insulated casing, a vertical tube sealed in said casing but opening at its upper end outside of said casing, a removable electric heater within and extending vertically along said tube and heating the water outside thereof along a line in the direction of the water flow, and an electric conductor for energizing said heater and connecting therewith through the open upper end of said tube.

4. An electrically heated storage tank combined with a hot-water supply system and comprising an upright, heat-insulated casing, a casing outside of the insulation, circuit-pipes passing through both casings into the top and bottom of the interior casing, a vertical tube sealed in said interior casing but open at its upper end above the casing, an electric heater extending vertically along the inside of said tube and heating the water outside thereof at succeeding points along the line of water flow, and a supply conductor for energizing said heater connecting therewith through the open upper end of the tube.

5. An electrically-heated storage-tank for a hot-water supply system comprising an upright heat-insulated casing, two vertical interior tubes open at their upper ends but sealed in said casing, and a removable thermostat and a removable electric heater in the respective tubes insertable through the open upper ends thereof, the said heater having a greater vertical length than the said thermostat.

6. An electrically-heated storage-tank for a hot-water supply system comprising an upright heat-insulated casing, a vertical tube in said casing open at its upper end above the casing and sealed in the wall thereof, and a separable electric heater in said tube supported through the open upper end thereof.

7. The organization specified in claim 6 together with a similar vertical open-ended tube in the casing, and a separable thermostat therein controlling the heater and supported through the open upper end of its tube.

8. An electrically-heated storage tank for a hot-water supply system comprising an upright heat-insulated casing provided with an outside compartment at its upper end, a vertical tube in said casing opening at its upper end into said compartment but sealed in the wall of the casing, and a separable electric heater in said tube removable from the upper end thereof through the said compartment.

9. The organization specified in claim 8 together with a similar vertical open-ended tube and a separable thermostat therein removable from the upper end thereof through said compartment.

10. An electrically-heated storage tank for a hot-water supply system comprising an upright heat-insulated casing, a vertical tube in said casing open at its upper end above the casing and sealed in the wall thereof, a separable electric heater in said tube removable through the open upper end thereof, and a second vertical tube in the casing enclosing the aforesaid heater-receiving tube with an intermediate space between them and open both at top and bottom to provide an isolated upflowing column of water in said space.

Signed at Albany, county of Albany, State of New York, this 11 day of July, 1927.

LEE P. HYNES.